United States Patent [19]

Clark

[11] Patent Number: 5,448,045
[45] Date of Patent: Sep. 5, 1995

[54] SYSTEM FOR PROTECTING COMPUTERS VIA INTELLIGENT TOKENS OR SMART CARDS

[76] Inventor: Paul C. Clark, 4705 Broad Brook Dr., Bethesda, Md. 20814

[21] Appl. No.: 23,628

[22] Filed: Feb. 26, 1993

Related U.S. Application Data

[63] Continuation-in-part of Ser. No. 841,814, Feb. 26, 1992, abandoned.

[51] Int. Cl.⁶ .............................................. G06K 5/00
[52] U.S. Cl. ........................................ 235/382; 380/4; 380/25
[58] Field of Search ............ 235/375, 380, 382, 382.5; 380/4, 25

[56] References Cited

U.S. PATENT DOCUMENTS

| | | | |
|---|---|---|---|
| 4,271,482 | 6/1981 | Giraud | 235/375 |
| 4,453,074 | 6/1984 | Weinstein | 235/380 |
| 4,799,258 | 1/1989 | Davies | 380/25 |
| 4,829,169 | 5/1989 | Watanabe | 235/492 |
| 4,849,615 | 7/1989 | Mollet | 235/380 |
| 4,935,962 | 6/1990 | Austin | 380/25 |
| 4,937,437 | 6/1990 | Ferguson | 235/382 |
| 4,951,249 | 8/1990 | McClung et al. | 380/4 |
| 4,985,920 | 1/1991 | Seki | 380/23 |
| 5,036,461 | 7/1991 | Elliott et al. | 364/408 |
| 5,050,212 | 9/1991 | Dyson | 380/25 |
| 5,051,564 | 9/1991 | Schmidt | 235/381 |
| 5,083,309 | 1/1992 | Beysson | 380/25 |
| 5,120,939 | 6/1992 | Claus et al. | 235/382 |
| 5,146,499 | 9/1992 | Geffrotin | 380/23 |
| 5,159,182 | 10/1992 | Eisele | 235/492 |
| 5,180,901 | 1/1993 | Hiramatsu | 235/382 |
| 5,187,352 | 2/1993 | Blair et al. | 235/382 |
| 5,338,923 | 8/1994 | Grieu | 235/492 |

FOREIGN PATENT DOCUMENTS

95623  6/1984  Japan ................................. 235/382

OTHER PUBLICATIONS

SmartDisk Brochure, "The Intelligent 3 ½" Diskette".
Clark et al., "BITS: A Smartcard Protected Operating System", Institute for Information Science and Technology, Nov. 1992, pp. 1–13.

Primary Examiner—John Shepperd
Attorney, Agent, or Firm—Fish & Richardson

[57] ABSTRACT

The possibility of corruption of critical information required in the operation of a computer is reduced by storing the critical information in a device; communicating authorization information between the device and the computer; and causing the device, in response to the authorization information, to enable the computer to read the critical information stored in the device. The device includes a housing, a memory within the housing containing information needed for startup of the host computer, and a communication channel for allowing the memory to be accessed externally of the housing. The device is initialized by storing the critical information in memory on the device, storing authorization information in memory on the device, and configuring a microprocessor in the device to release the critical information to the computer only after completing an authorization routine based on the authorization information.

17 Claims, 8 Drawing Sheets

SYSTEM FOR PROTECTING COMPUTERS VIA INTELLIGENT TOKENS OR SMART CARDS

CROSS REFERENCE TO RELATED APPLICATIONS

This is a continuation-in-part of application Ser. No. 07/841,814 filed Feb. 26, 1992, now abandoned.

BACKGROUND OF THE INVENTION

This invention relates to reducing the possibility of corruption of critical information required in the operation of a computer system. In particular, the invention is aimed at preventing boot-sector computer viruses and protecting critical executable code from virus infection.

The process of starting up a computer, i.e., booting or boot-strapping a computer is well known, but we describe aspects of it here for the sake of clarity and in order to define certain terms and outline certain problems which are solved by this invention.

FIG. 1 depicts a typical computer system 10 with central processing unit (CPU) 12 connected to memory 14. Display 18, keyboard 16, hard disk drive 17, and floppy disk drive 19 are connected to computer system 10.

A typical computer system such as shown in FIG. 1 uses a program or set of programs called an operating system (OS) as an interface between the underlying hardware of the system and its users. A typical OS, e.g., MS-DOS Version 5.0, is usually divided into at least two parts or levels. The first level of the OS, often referred to as the kernel of the OS, provides a number of low-level functions called OS primitives which interact directly with the hardware. These low-level primitives include, for example, functions that provide the basic interface programs to the computer system's keyboard 16, disk drives 17, 19, display 18, and other attached hardware devices. The OS primitives also include programs that control the execution of other programs, e.g., programs that load and initiate the execution of other programs. Thus, for example, if a user wishes to run a word-processing program or a game program, it is the primitives in the OS kernel which load the user's program from a disk in one of the attached disk drives 17, 19 into the computer system's memory 14 and begins executing it on CPU 12.

The second level of the OS typically consists of a number of executable programs that perform higher-level (at least from a user's perspective) system related tasks, e.g., creating, modifying, and deleting computer files, reading and writing computer disks or tapes, displaying data on a screen, printing data, etc. These second-level OS programs make use of the kernel's primitives to perform their tasks. A user is usually unaware of the difference between the kernel functions and those which are performed by other programs.

A third level of the OS, if it exists, might relate to the presentation of the OS interface to the user. Each level makes use of the functionality provided by the previous levels, and, in a well designed system, each level uses only the functionality provided by the immediate previous level, e.g., in a four level OS, level 3 only uses level 2 functions, level 2 only uses level 1 functions, level 1 only uses level 0 functions, and level 0 is the only level that uses direct hardware instructions.

FIG. 2 depicts an idealized view of a four level OS, with a level for hardware (level 0) 2, the kernel (level 1) 4, the file system (level 2) 6, and the user interface (level 3) 8.

An OS provides computer users with access and interface to a computer system. Operating systems are constantly evolving and developing to add improved features and interfaces. Furthermore, since an OS is merely a collection of programs (as described above), the same computer system, e.g. that shown in FIG. 1, can have a different OS running on it at different times. For example, the same IBM personal computer can run a command-line based OS, e.g., MS-DOS V5.0, or a graphical, icon based OS, e.g., MS-Windows 3.0.

In order to deal with the evolution of operating systems (as well as to deal possible errors in existing operating systems) computer system manufacturers have developed a multi-stage startup process, or boot process, for computers. Rather than build a version of the OS into the system, the multi-stage boot process works as follows:

A boot program is built into the computer system and resides permanently in read-only memory (ROM) or programmable read-only memory (PROM) (which is part of memory 14) on the system. Referring to FIG. 4, a computer system's memory 14 can consist of a combination of Random Access Memory (RAM) 24 and ROM 26. The ROM (or PROM) containing the boot program is called the boot ROM 28 (or boot PROM). A boot program is a series of very basic instructions to the computer's hardware that are initiated whenever the computer system is powered up (or, on some systems, whenever a certain sequence of keys or buttons are pressed). The specific function of the boot program is to locate the OS, load it into the computer's memory, and begin its execution. These boot programs include the most primitive instructions for the machine to access any devices attached to it, e.g., the keyboard, the display, disk drives, a CD-ROM drive, a mouse, etc.

To simplify boot programs and to make their task of locating the OS easy, most computer system manufacturers adopt conventions as to where the boot program is to find the OS. Two of these conventions are: the OS is located in a specific location on a disk, or the OS is located in a specific named file on a disk. The latter approach is adopted by the Apple Macintosh TM computer where the boot program looks for a file named "System" (which contains, e.g., Apple's icon-based graphical OS) on disks attached to the computer. The former approach, i.e., looking for the OS in a particular location, e.g., on a disk, is the one currently used by most I.B.M. personal computers (and clones of those systems). In these systems the boot program looks, in a predetermined order, for disks in the various disk drives connected to the system (many computer systems today have a number of disk drives, e.g., a floppy-disk drive, a CD-ROM, and a hard-disk drive). Once the boot program finds a disk in a disk drive, it looks at a particular location on that disk for the OS. That location is called the boot sector of the disk.

Referring to FIG. 3, a physical disk 9 is divided into tracks which are divided up into sectors 11 (these may actually be physically marked, e.g., by holes in the disk, in which case they are called hard-sectored, but more typically the layout of a disk is a logical, i.e. abstract layout). The boot sector is always in a specific sector on a disk, so the boot program knows where to look for it. Some systems will not allow anything except an OS to be written to the boot sector, others assume that the contents of the boot sector could be anything and therefore adopt conventions, e.g., a signature in the first part of the boot sector, that enables the boot program to determine whether or not it has found a boot sector with an OS. If not it can either give up and warn the user or it can try the next disk drive in its predetermined search sequence.

Once the boot program has determined that it has found a boot sector with an OS (or part of an OS), it loads (reads) into memory 14 the contents of the boot sector and then begins the execution of the OS it has just loaded. When the OS begins execution it may try to locate more files, e.g., the second level files described above, before it allows the user access to the system. For example, in a DOS-based system, the program in the boot sector, when executed, will locate, load into memory, and execute the files, IO.SYS, MSDOS.SYS, COMMAND.COM, CONFIG.SYS, and AUTOEXEC.BAT. (Similarly, in a multi-level system, each level loads the next one, e.g., the Hewlett-Packard Unix TM - like System HPUX has at least 4 levels which get loaded before the user is presented with an interface to the computer system.)

The process of booting a computer system is sometimes called the boot sequence. Sometimes the boot sequence is used to refer only to the process executed by the first boot program.

Computer viruses aimed at personal computers (PCs) have proliferated in recent years. One class of PC viruses is known as boot infectors. These viruses infect the boot-sectors of floppy or hard disks in such a way that when the boot sequence of instructions is initiated, the virus code is loaded into the computer's memory. Because execution of the boot sequence precedes execution of all application programs on the computer, antiviral software is generally unable to prevent execution of a boot-sector virus.

Recall, from the discussion above, that the boot program loads into memory the code it finds in the boot sector as long as that code appears to the boot program to be valid.

In addition to the boot infector class of viruses, there is another class of viruses called file infectors which infect executable and related (e.g., overlay) files. Each class of virus requires a different level or mode of protection.

File infector viruses typically infect executable code (programs) by placing a copy of themselves within the program; when the infected program is executed so is the viral code. In general, this type of virus code spreads by searching the computer's file system for other executables to infect, thereby spreading throughout the computer system.

One way that boot-sector viruses are spread is by copying themselves onto the boot-sectors of all disks used with the infected computers. When those infected disks are subsequently used with other computers, as is often the case with floppy disks, they transfer the infection to the boot-sectors of the disks attached to other machines. Some boot-sector viruses are also file infectors. These viruses copy themselves to any executable file they can find. In that way, when the infected file is executed it will infect the boot sectors of all the disks on the computer system on which it is running.

Recall, from the discussion above, that an OS may consist of a number of levels, some of which are loaded from a boot sector, and others of which may be loaded into the system from other files on a disk. It is possible to infect an OS with a virus by either infecting that part of it the resides in the boot sector (with a boot-sector virus) or by infecting the part of it that is loaded from other files (with a file-infector virus), or both. Thus, in order to maintain the integrity of a computer operating system and prevent viruses from infecting it, it is useful and necessary to prevent both boot-sector and file-infector viruses.

Work to develop virus protection for computers has often been aimed at PCs and workstations, which are extremely vulnerable to virus infection. The many commercial packages available to combat and/or recover from viral infection attest to the level of effort in this area.

Unfortunately, computer virus authors produce new versions and strains of virus code far more rapidly than programs can be developed to identify and combat them. Since viruses are typically recognized by a "signature", i.e., a unique sequence of instructions, new viral code may at times be difficult to identify. Existing signature-based virus detection and eradication programs require knowledge of the signature of a virus in order to detect that virus. Current systems employ different strategies to defend against each type of virus. In one of these strategies to protect against boot infectors, first a clean (uninfected) copy of the boot-sector is made and kept on a backup device, e.g., a separate backup disk. Subsequent attempts to write to the boot-sector are detected by the anti-viral software in conjunction with the OS and the user is warned of potential problems of viral infection. Since reading from and writing to a disk is a function performed by the OS kernel, it knows when a disk is written to and which part of the disk is being written. Anti-virus software can be used to monitor every disk write to catch those that attempt to modify the boot sector. (Similarly, in systems which keep the OS in a particular named file, every attempt to modify that file can be caught). At this point, if the boot-sector has been corrupted the user can replace it with a clean copy from the backup disk.

To inhibit file infectors an integrity check, e.g., a checksum is calculated and maintained of all executables on the system, so that any subsequent modification may be detected. A checksum is typically an integral value associated with a file that is some function of the contents of the file. In the most common and simple case the checksum of a file is the sum of the integer values obtained by considering each byte of data in the file as an integer value. Other more complicated schemes of determining a checksum are possible, e.g., the sum of the bytes in the file added to the size of the file in bytes. Whatever the scheme used, a change in the file will almost always cause a corresponding change in the checksum value for that file, thereby giving an indication that the file has been modified. If a file is found with a changed checksum, it is assumed to be infected. It can be removed from the computer system and a clean copy can restored from backup.

Many viruses use the low-level primitive functions of the OS, e.g., disk reads and writes, to access the hardware. As mentioned above, these viruses can often be caught by anti-viral software that monitors all use of the OS's primitives. To further complicate matters however, some viruses issue machine instructions directly to the hardware, thus avoiding the use of OS primitive functions. Viruses which issue instructions directly to the hardware can bypass software defenses because there is no way that their activities can be monitored. Further, new self-encrypting (stealth) viruses may be extremely difficult to detect, and thus may be overlooked by signature recognition programs.

One approach to the boot integrity problem is to place the entire operating system in read-only memory (ROM) 26 of the computer 10. However, this approach has disadvantages in that it prevents modifications to boot information, but at the cost of updatability. Any upgrades to the OS require physical access to the hardware and replacement of the ROM chips. It is also the case that as operating systems become more and more sophisticated, they become larger and larger. Their placement in ROM would require larger and larger ROMs. If user authentication is added to the boot program, passwords may be difficult to change and operate on a per machine rather than a per user basis.

Some Operating Systems have so-called login programs which require users to enter a password in order to use the system. These login programs, whether stand-alone or integrated with an antiviral program, suffer from the same timing issues as previously mentioned. Also since most PCs provide a means of booting from alternate devices, e.g., a floppy disc drive, login programs can often be trivially defeated.

SUMMARY OF THE INVENTION

In general, in one aspect, the invention features reducing the possibility of corruption of critical information required in the operation of a computer, by storing the critical information in a device; communicating authorization information between the device and the computer; and causing the device, in response to the authorization information, to enable the computer to read the critical information stored in the device.

Embodiments of the invention include the following features. The authorization information may be a password entered by a user and verified by the device (by comparison with a pre-stored password for the user); or biometric information (e.g. a fingerprint) about a user. The device may be a pocket-sized card containing the microprocessor and the memory (e.g., a smartcard). The critical information may include boot-sector information used in starting the computer; or executable code; or system data or user data; or file integrity information. The computer may boot itself from the critical information read from the device by executing modified boot code (stored as a BIOS extension) in place of normal boot code.

The device may pass to the computer secret information shared with the computer (e.g., a host access code); the computer validates the shared secret information. The authorization information may be file signatures for executable code; or a user's cryptographic key.

A communication link between the device and the computer carries the authorization information and the critical information.

In general, in another aspect, the invention features initializing a device for use in reducing the possibility of corruption of critical information required in the operation of a computer, by storing the critical information in memory on the device, storing authorization information in memory on the device, and configuring a microprocessor in the device to release the critical information to the computer only after completing an authorization routine based on the authorization information.

In general, in another aspect, the invention features a portable intelligent token for use in effecting a secure startup of a host computer. The token includes a housing, a memory within the housing containing information needed for startup of the host computer, and a communication channel for allowing the memory to be accessed externally of the housing.

In embodiments of the invention, the memory also contains a password for authorization, and a processor for comparing the stored password with externally supplied passwords. The memory may store information with respect to multiple host computers.

Among the advantages of the invention are the following.

The invention provides extremely powerful security at relatively low cost, measured both in terms of purchase price and setup time. The additional hardware required is nominal, initial setup is one-time only, and upgrades require no hardware access—provided the user has the proper authentication. The invention obviates the need to defend against boot infectors and greatly reduces the risk to selected executables. The invention eliminates the PC's vulnerability to boot infectors, ensures the integrity of selected data, and guarantees the reliability of executables uploaded from the smartcard. Due to the authentication which occurs in the boot sequence, the possibility of sabotage or unauthorized use of the PC is restricted to those users who possess both a properly configured smartcard and the ability to activate it.

Other advantages and features will become apparent from the following description and from the claims.

DESCRIPTION

The invention makes use of so-called intelligent tokens to store a protected copy of the file that is usually stored in a disk boot sector, along with other file integrity data.

Intelligent tokens are a class of small (pocket-sized) computer devices which consist of an integrated circuit (IC) mounted on a transport medium such as plastic. They may also include downsized peripherals necessary for the token's application. Examples of such peripherals are keypads, displays, and biometric devices (e.g., thumbprint scanners). The portability of these tokens lends itself to security-sensitive applications.

A subclass of intelligent tokens are IC cards, also known as smartcards. The physical characteristics of smartcards are specified by The International Standards Organization (ISO) (described in International Standard 7816-1, Identification Cards—Integrated Circuit(s) with Contacts—Physical Characteristics, International Standards Organization, 1987). In brief, the standard defines a smartcard as a credit card sized piece of flexible plastic with an IC embedded in the upper left hand side. Communication with the smartcard is accomplished through contacts which overlay the IC (described in International Standard 7816-2, Identification Cards—Integrated Circuit(s) With Contacts—Dimensions and Location of the Contacts, International Standards Organization, 1988). Further, ISO also defines multiple communications protocols for issuing commands to a smartcard (described in International Standard 7816-3, Identification Cards—Integrated Circuit(s) With Contacts—Electronic Signals and Transmission Protocols, International Standards Organization, 1989). While all references to smartcards here refer to ISO standard smartcards, the concepts and applications are valid for intelligent tokens in general.

The capability of a smartcard is defined by its IC. As the name implies, an integrated circuit consists of multiple components combined within a single chip. Some possible components are a microprocessor, non-static random access memory (RAM), read only memory (ROM), electrically programmable read only memory (EPROM), nonvolatile memory (memory which retains its state when current is removed) such as electrically erasable programmable read only memory (EEPROM), and special purpose coprocessor(s). The chip designer selects the components as needed and designs the chip mask. The chip mask is burned onto the substrate material, filled with a conductive material, and sealed with contacts protruding.

Figure 5:
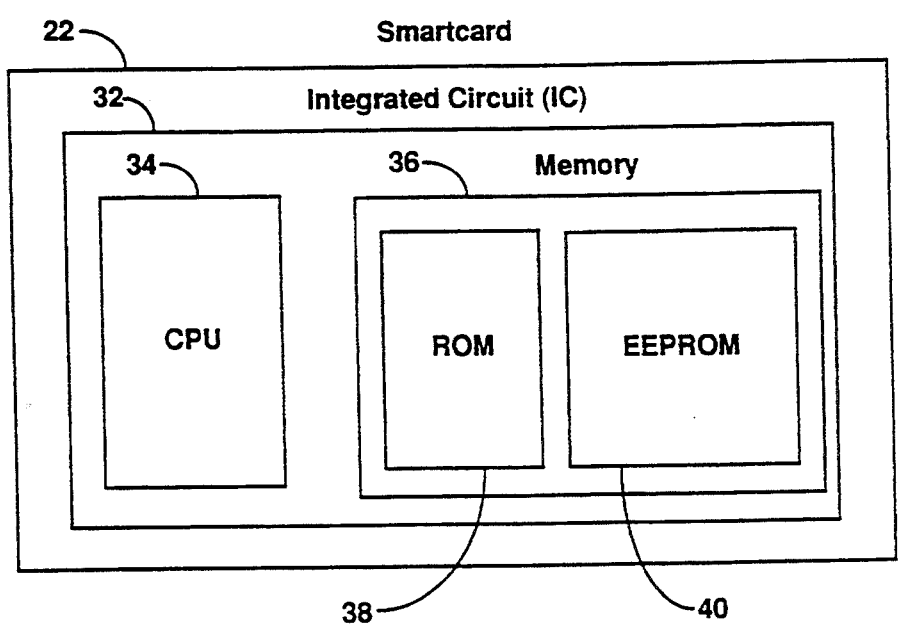
FIGS. 5-6 show, schematically, a smartcard and its memory.

FIG. 5 depicts a typical smartcard 22 with IC 32 which contains a CPU 34 and memory 36. Memory 36 is made up of a ROM 38 and an EEPROM 40.

The current substrate of choice is silicon. Unfortunately silicon, like glass, is not particularly flexible; thus to avoid breakage when the smartcard is bent, the IC is limited to only a few millimeters on a side. The size of the chip correspondingly limits the memory and processing resources which may be placed on it. For example, EEPROM occupies twice the space of ROM while RAM requires twice the space of EEPROM. Another factor is the mortality of the EEPROM used for data storage, which is generally rated for 10,000 write cycles and deemed unreliable after 100,000 write cycles.

Several chip vendors (currently including Intel, Motorola, SGS Thompson, and Hitachi) provide ICs for use in smartcards. In general, these vendors have adapted eight-bit micro-controllers, with clock rates of approximately 4 megahertz (Mhz) for use in smartcards. However, higher performance chips are under development. Hitachi's H8/310 is representative of the capabilities of today's smartcard chips. It provides 256 bytes of RAM, 10 kilobytes (K) of ROM, and 8 K of EEPROM. The successor, the H8/510, not yet released, claims a 16-bit 10 Mhz processor, and twice the memory of the H8/310. It is assumed that other vendors have similar chips in various stages of development.

Due to these and other limits imposed by current technology, tokens are often built to application-specific standards. For example, while there is increased security in incorporating peripherals with the token, the resulting expense and dimensions of self-contained tokens is often prohibitive. Because of the downsizing required for token-based peripherals, there are also usability issues involved. From a practical perspective, peripherals may be externally provided as long as there is reasonable assurance of the integrity of the hardware and software interface provided. The thickness and bend requirements for smartcards do not currently allow for the incorporation of such peripherals, nor is it currently feasible to provide a constant power supply. Thus, today's smartcards must depend upon externally provided peripherals to supply user input as well as time and date information, and a means to display output. Even if such devices existed for smartcards, it is likely that cost would prohibit their use. For most applications it is more cost effective to provide a single set of high cost input/output (I/O) devices for multiple cards (costing $15–$20 each) than to increase smartcard cost by orders of magnitude. This approach has the added benefit of encouraging the proliferation of cardholders.

Smartcards are more than adequate for a variety of applications in the field of computer security (and a number of applications outside the field). The National Institute of Standards and Technology (NIST) has developed the Advanced Secure Access Control System (ASACS) which provides both symmetric (secret key) and asymmetric (public key) cryptographic algorithms on a smartcard (described in An Overview Of The Advanced Smartcard Access Control System, J. Dray and D. Balenson, Computer Security Division/Computer Systems Laboratory, National Institute of Standards and Technology, Gaithersburg, Maryland). The ASACS utilizes DES (Data Encryption Standard) (described in Data Encryption Standard—FIPS Publication 46-1, National Institute of Standards and Technology (formerly NBS), Gaithersburg, Maryland) for login authentication using the 9.26 standard authentication protocol (defined in Financial Institution Sign-on Authentication For Wholesale Financial Systems [DES-based user authentication protocols], ANSI X9.26, X9 Secretariat, American Bankers Association, Washington, D.C.). It further offers a choice of RSA (described in R. L. Rivest, A. Shamir, L. M. Adleman, "A Method for Obtaining Digital Signatures and Public Key Cryptosystems," Communications of the ACM, pp. 120–126, Volume 21, Number 2, February 1978) or DSA (described in "The Digital Signature Standard Proposed by NIST" Communications of the ACM, Volume 35, No. 7, July, 1992, pp. 36–40) for digital signatures.

The ASACS card provides strong security because all secret information is utilized solely within the confines of the card. It is never necessary for a secret or private key to be transferred from the card to a host computer; all cryptographic operations are performed in their entirety on the card. Although the current H8/310 equipped card requires up to 20 seconds to perform sign and verify operations, a new card developed for the National Security Agency (NSA) is capable of performing the same operations in less than a second. The NSA card is equipped with an Intel 8031 processor, a Cylink CY513 modular exponentiator (coprocessor), 512 bytes of RAM and 16 Kbytes of EEPROM. Since both the RSA and DSA algorithms are based on modular exponentiation, it is the Cylink coprocessor which accounts for the NSA card's greatly enhanced performance.

Trusted Information Systems (TIS), a private computer security company, is currently integrating smartcards for use with privacy enhanced computer mail in a product called TISPEM. A user-supplied smartcard is used to store the user's private key and in addition provides service calls for digital signatures and encryption so that all operations involving the private key are performed on the card. In this way the private key need never leave the card. Thus, a TISPEM user can sit down at any terminal which has access to the application software (and a smartcard reader) and read encrypted mail and send signed messages without fear of compromising his or her private key.

Figure 6:
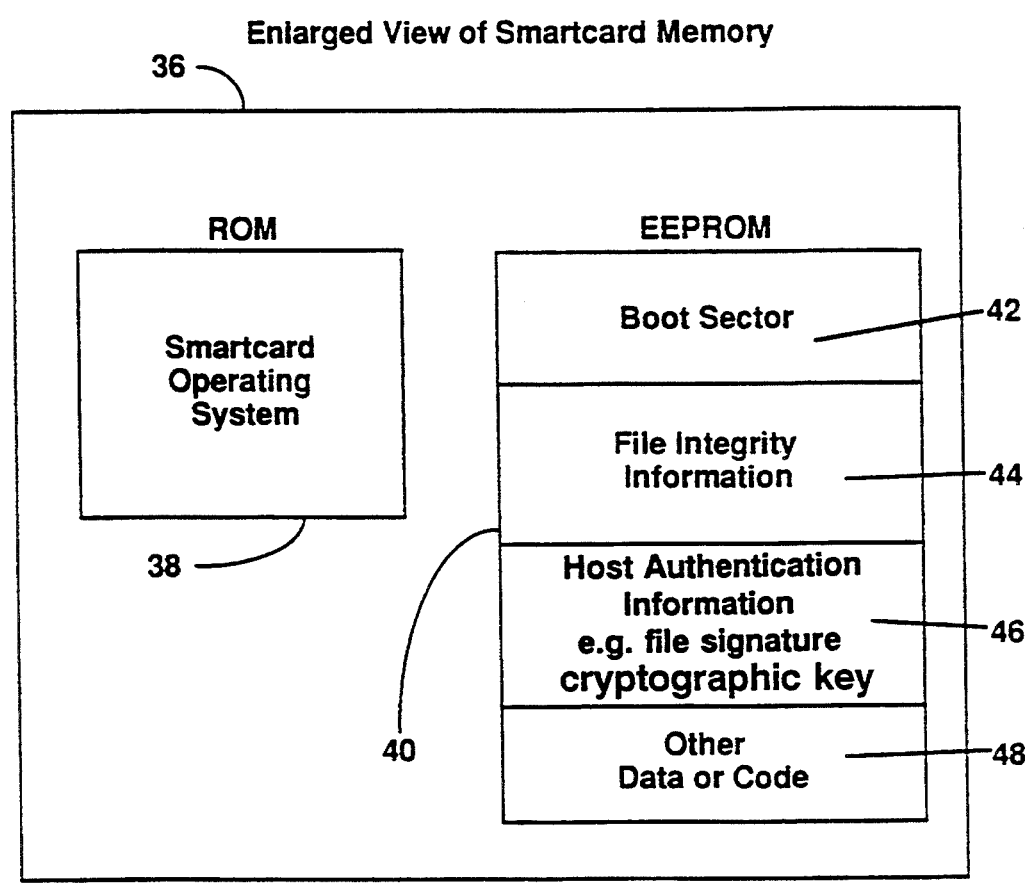

Referring to FIGS. 5 and 6, in the invention, a smartcard's memory 36 contains an propriety operating system and software programs to enforce access control (in ROM 38) together with critical information 42, 44, 46 usually stored in the host's boot-sector, directory, and executables (in EEPROM 40). The amount of memory available on the token will dictate the amount of data which may be stored. In addition, other sensitive or private information 48 may be stored to ensure its integrity.

One aspect of I.B.M. personal computers and their clones is that the computer systems are not all identically configured. Some computer systems may have devices, e.g., display monitors or optical disks, that other systems do not have. Some of these computer systems have slots which can accept addin boards which can be used to enhance the system by, for example increasing its speed or the resolution of its display. In order to overcome the complications introduced by non-uniformity of computer platforms, a set of functions that provide an interface to the low-level input/output (I/O) system is provided. In the I.B.M. PC systems this system is called the Basic Input Output System (BIOS) and resides in the EPROM and is loaded by the boot program before it loads the program from the boot sector.

I.B.M. PCs are expandable and can have new devices attached to them using cards inserted into slots in the computer's chassis. A new device or card may need to extend the interface to the low-level I/O system, i.e., to extend the BIOS. To do this it uses a BIOS Extension.

The system takes advantage of the following feature of the PC's boot sequence: after loading the BIOS but before loading the boot sector, the boot program examines each expansion slot in the computer, looking for a BIOS extension. If it finds one it hands over control to that extension. In a typical PC system the BIOS extension would load its functions into the system and then pass control back to the boot program. After checking all extension slots for BIOS extensions the boot program then begins looking in the disk drives for a disk with a boot sector from which to boot.

Figure 7:
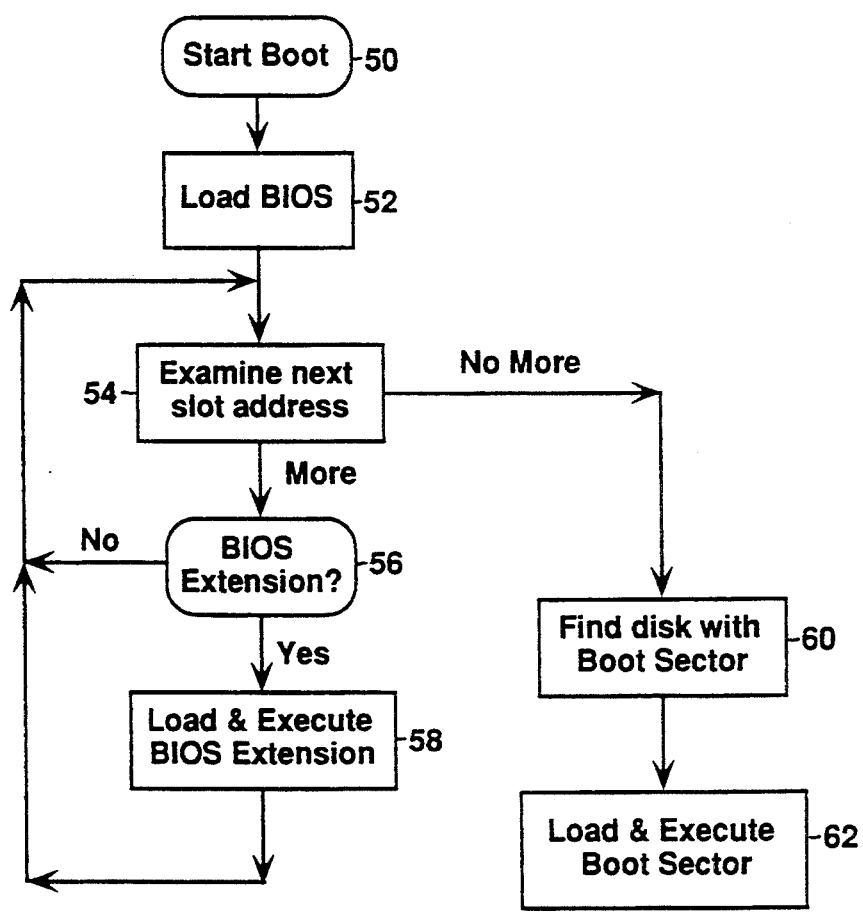
FIGS. 7-10 are flow diagrams of boot processes.

FIG. 7 describes the boot sequence of a PC. When the boot sequence is started 50 (either by cycling the power of the computer or by pressing a particular sequence of keys on the keyboard) the boot program in ROM 28 of the computer system loads the BIOS code 52 into memory 14. This BIOS code allows the program to interact with attached devices. The boot program then examines each slot 54 (by address) in turn to determine if it contains a board with a BIOS extension 56. If the boot program finds a slot with a BIOS extension then it loads and executes the code associated with that BIOS extension 58. After the BIOS extension's code is executed, control is passed back to the boot program to examine the next slot address 54. When all slots have been examined the boot program then tries to find a boot disk, i.e., a disk with a boot sector 60. (I.B.M. PCs are configured to look for a boot disk starting in the floppy drives and then on the hard drives.) Once a boot disk is found, its boot sector is loaded and executed 62.

A Smartcard-Based Operating System

A prototype of the invention, also referred to herein as The Boot Integrity Token System (BITS), has been developed to provide computer boot integrity and enforce access control for an IBM or compatible system (PC-BITS), although the technology described is applicable to a wide variety of other computer systems.

Figure 1:
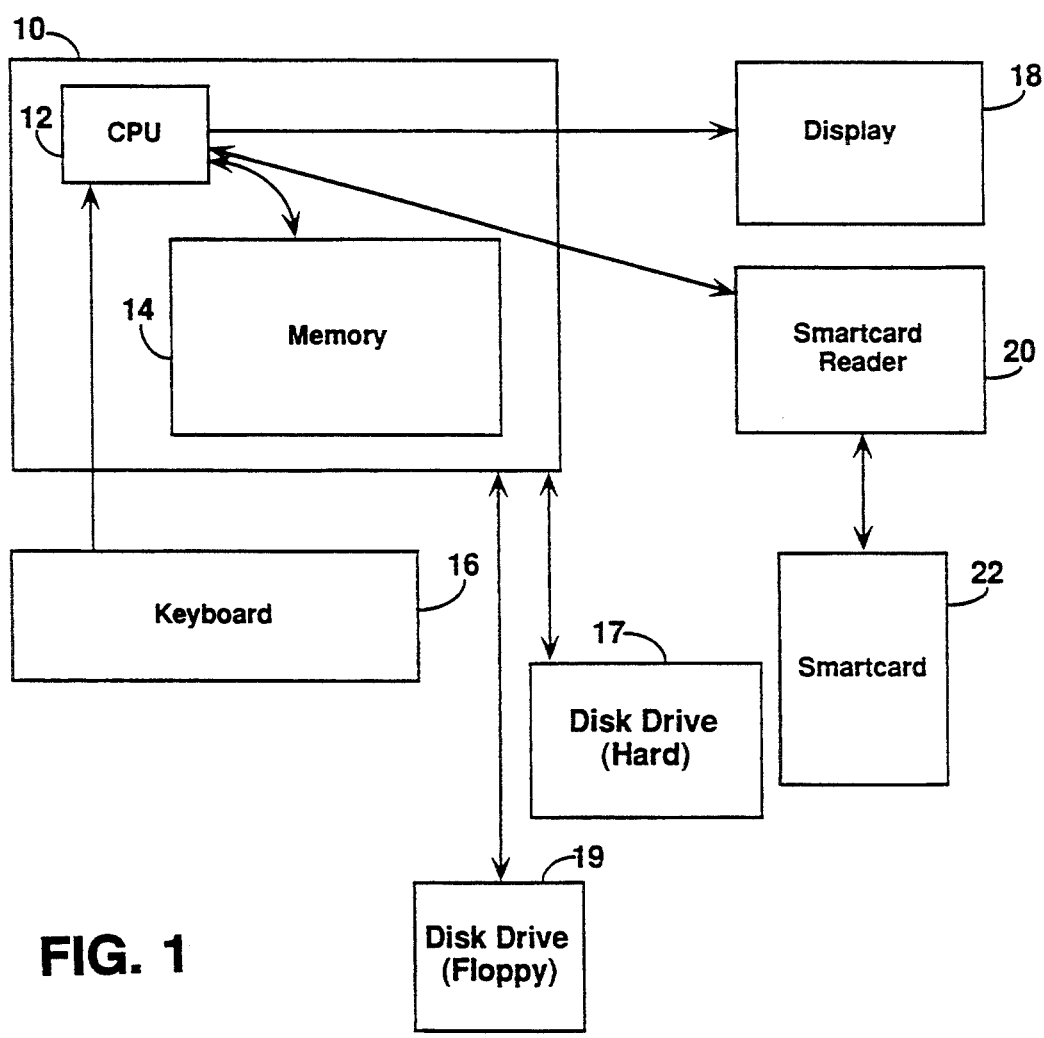
FIG. 1 is a diagram of a typical computer system using the invention.
Figure 2:
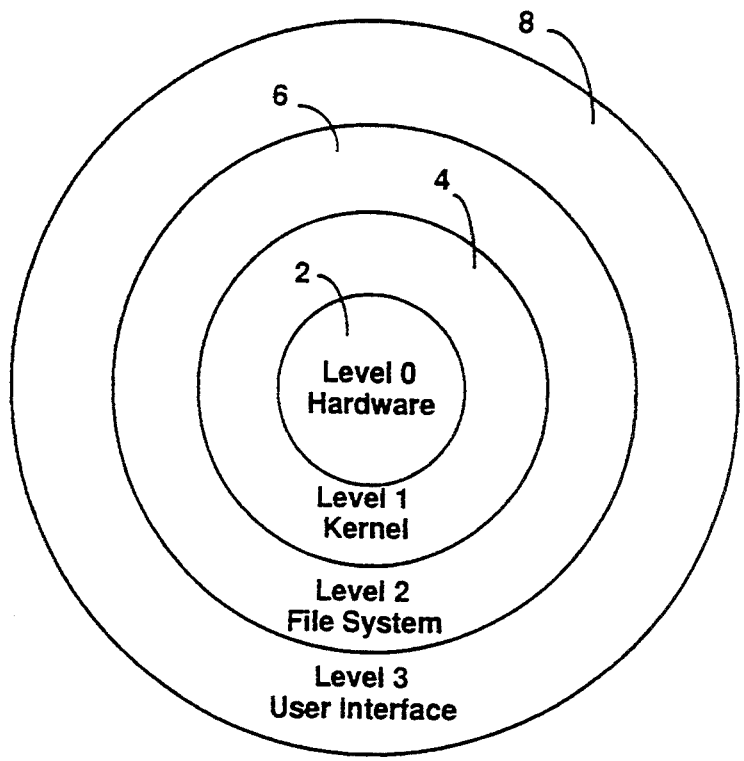
FIG. 2 depicts the levels of an operating system.
Figure 3:
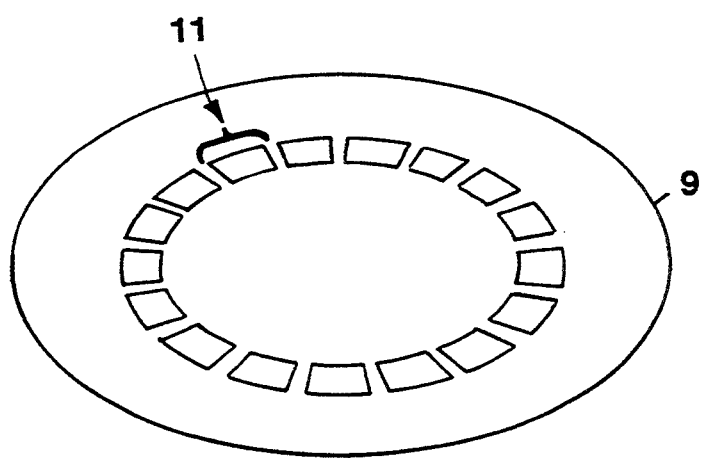
FIG. 3 shows the layout of a computer disk.
Figure 4:
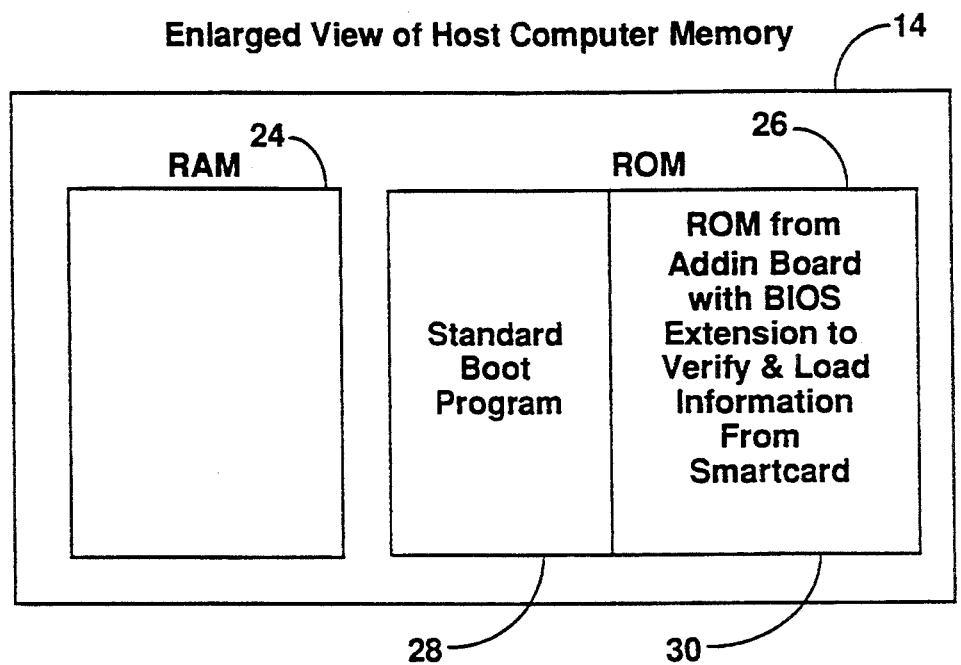
FIG. 4 is a view of the memory of the computer system shown in FIG. 1.

Referring again to FIG. 1, the basic idea behind BITS is that the host computer system 10 will actually boot itself from a smartcard 22. Since the smartcard 22 can be readily configured to require user authentication prior to data access, it provides an ideal mechanism to secure a host computer. Thus, if critical information required to complete the boot sequence is retrieved from a smartcard, boot integrity may be reasonably assured. The security of the system assumes the physical security of the host either with a tamper-proof or tamper-evident casing, and the security of the smartcard by its design and configuration. If an attacker can gain physical access to the hardware, it is impossible to guarantee system integrity.

Referring to FIGS. 1 and 4-6, the PC-BITS prototype consists of an 8-bit addin board 30, a smartcard drive 20 (reader/writer) which mounts in a floppy bay of computer system 10, configuration as well as file signature validation software, and a supply of smartcards. The board 30 contains a special boot PROM which is loaded with a program which interfaces to the smartcard reader. Further, the board is configurable to set an identifier for the host.

Figure 8:
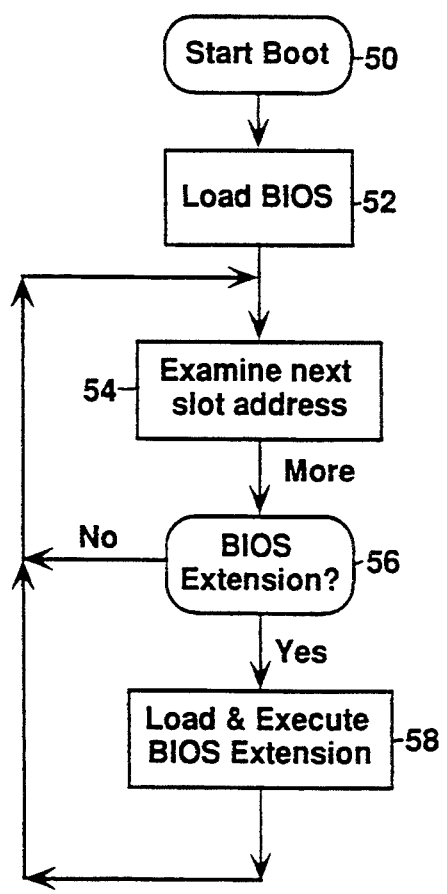

Installation and configuration of the host can be accomplished in minutes. The process involves insertion of the addin board and the equivalent of the installation of a floppy drive. Once installed, the computer will not complete the boot sequence without a valid user authentication to a properly configured smartcard. The reason for this is that the addin board 30 is a BIOS Extension board. Recall from the discussion above, with reference to FIG. 7, that the boot program loads and executes any and all BIOS extensions 58 before it looks for a boot disk 60. The addin board 30 takes control from the boot program when its BIOS extension is loaded, but it does not return control back to the boot program. Thus, the modified boot process is like that depicted in FIG. 8, where the process of looking for and loading a boot sector does not take place under control of the boot program, but under the control of the modified boot program on the BIOS Extension card.

During system startup, two authentications must be successfully performed to complete the boot sequence. First, the user enters a password which is checked by the smartcard to confirm that the user is authorized to use that card. If successful, the smartcard allows the PC to read the boot-sector and other information from the smart-card memory. To authenticate the smartcard to the host, the card must also make available a secret shared with the host, in this case the configurable host identifier. Table 1 illustrates these transactions. If both the user and card authentication are successful, the boot sequence completes, and control is given to the PC operating system—some or all of which has been retrieved from the smartcard. The user may then proceed to utilize the PC in the usual fashion, uploading additional information (i.e., applications or application integrity information) from the smartcard as needed.

TABLE 1

| | PC-BITS System Startup | |
|---|---|---|
| Step | Action | Implementation |
| 0 | Insert card and power up the host | Apply power and reset card |
| 1 | Authenticate user and present data to the smartcard | Present user password to the smartcard |
| 2 | Authenticate the card to the host | Host reads shared secret from the smartcard |
| 3 | Upload boot information | Host reads boot-sector from the smartcard |
| 4 | Integrity check host-resident boot files and complete boot sequence if successful | Host computes file-checksum which the smartcard encrypts to form a signature; this |

TABLE 1-continued

| | PC-BITS System Startup | |
|---|---|---|
| Step | Action | Implementation |
| | | value is compared with the signature stored on the card |

The card is expected to contain critical data such as digital file signatures for system executables and the user's cryptographic keys. Comparing executable file signatures with those stored on the smartcard provides a virus detection mechanism which is difficult to defeat. This approach is consistent with a recent trend to validate file integrity rather than solely scan for known virus signatures.

Figure 9:
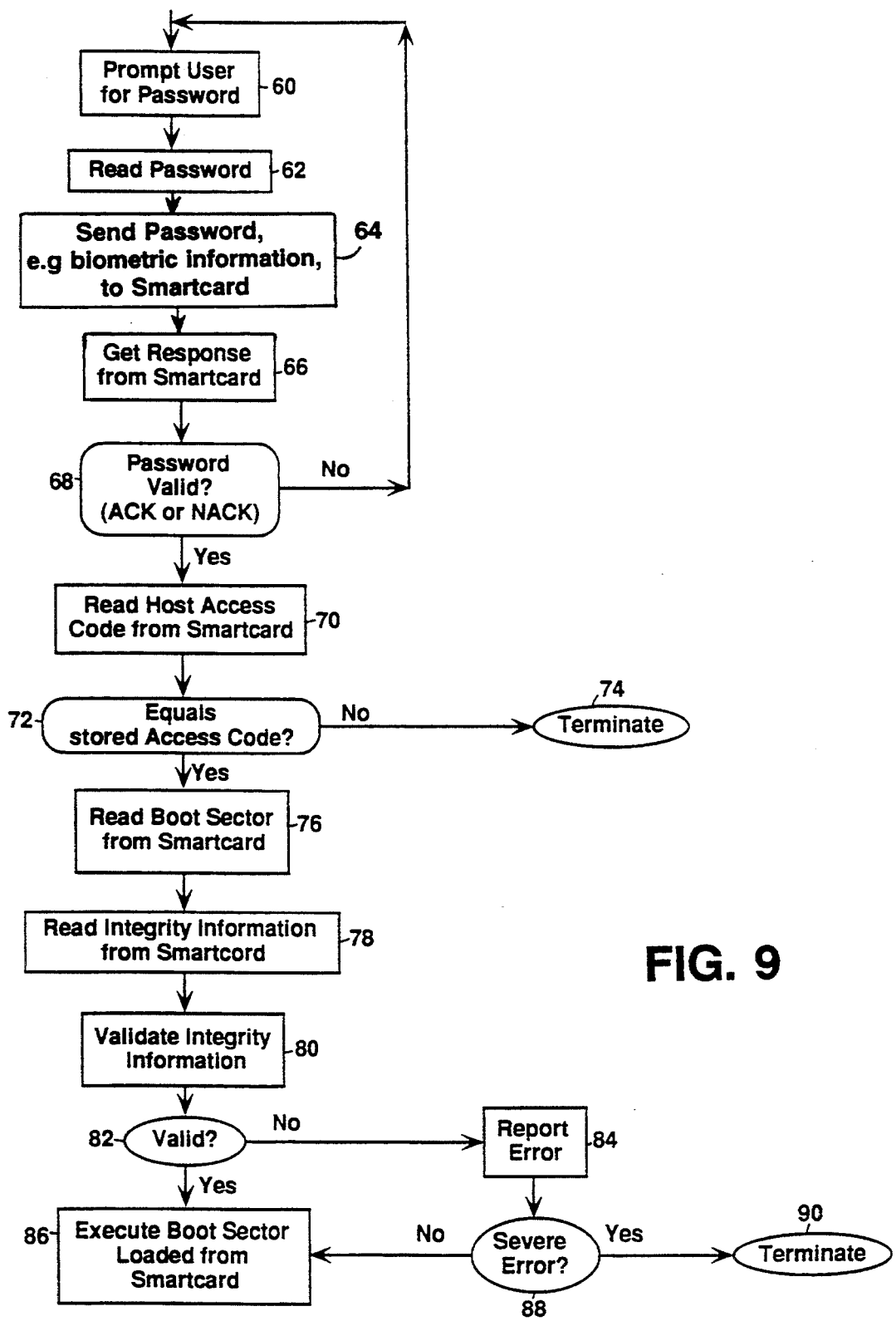
Figure 10:
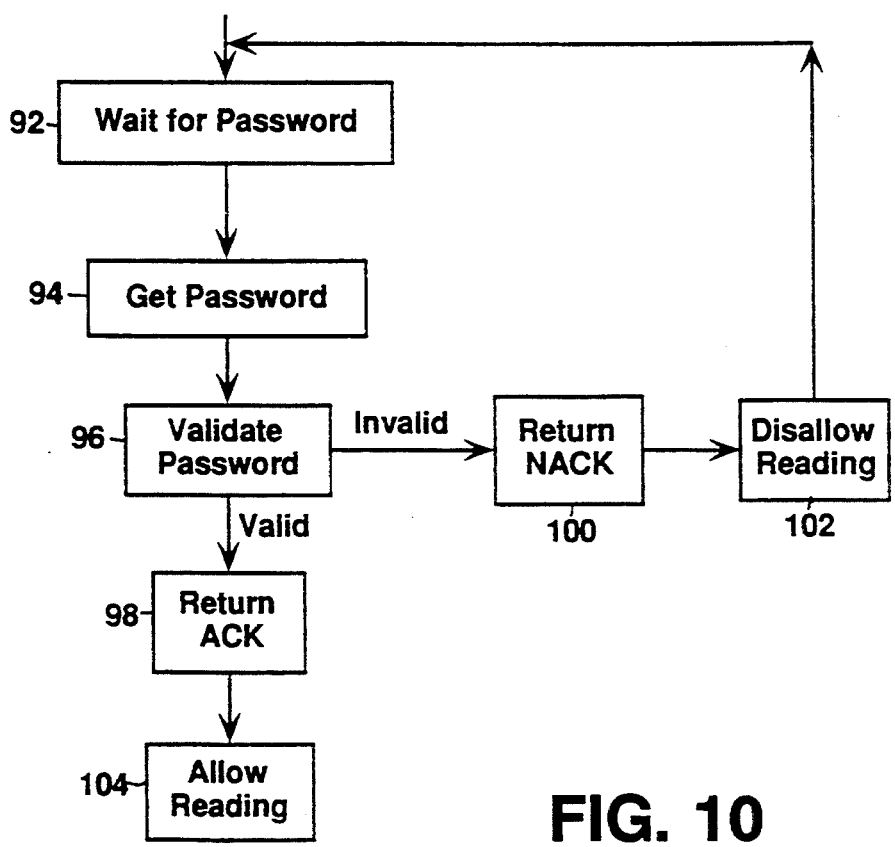

Refer now to FIGS. 9-10, which show the control flow of the modified boot sequence from the point of view of the computer system and the smartcard respectively. The flow diagram in FIG. 9 shows the control flow of the modified boot program loaded from the BIOS Extension addin card in step 58 (FIG. 8) of the original boot sequence. FIG. 10 shows the processing that occurs (during the boot sequence) on the CPU 34 of the smartcard 22 while it is in the smartcard reader 20.

The modified boot program (the BIOS extension) prompts the user for a password 60 on display 18. The password is read 62 from keyboard 16 and sent to the smartcard 22. At the same time, the smartcard is waiting for a password 92. When the smartcard 22 gets a password 94 from the computer system 10 it validates the password 96 using whatever builtin validation scheme comes with the smartcard. If the password is invalid then the smartcard 22 returns a "NACK" signal 100 to the computer system 10, disallows reading of its data 102 and continues to wait for another password 92. (In some systems a count is kept of the number of times an invalid password is entered, with only a limited number of failed attempts allowed before the system shuts down and requires operator or administrator intervention.) If the password is valid then the smartcard 22 returns an "ACK" signal 98 to the computer system 10 and allows reading of the data in its memory and files 104.

The computer system 10 waits for the response 66 from the smartcard 22 and then bases its processing on the returned result 68. If the password was invalid (i.e., the smartcard returned an "NACK" signal) then the user is once again prompted for a password 60 (recall again the discussion above about limiting the number of attempts.) If the password is valid the user has been authenticated to the smartcard and now the computer system attempts to authenticate the card for the system. It does this (in step 70) by reading a host access code 46 from EEPROM 40 of the smartcard 22. (The host access code is one of the items of data put on the smartcard by the system administrator during system configuration.) The host access code 46 from the smartcard is compared to the one that the system has stored about itself 72. If they are unequal then this smartcard 22 is not allowed for this host computer system 10 and the boot process is terminated 74. (Note that this termination ends the entire boot process—the boot program does not then try to boot from a disk). If the check at step 72 finds the codes to be equal then the card is authenticated to the host and the boot sector 42 from EEPROM 40 of smartcard 22 is read (step 76) into memory 14 of computer system 10.

Recall that, because of the limited size of the memory on smartcards today, it is not yet possible to store all the information and files for an OS the size of, e.g., MS-DOS on a smartcard. Therefore the other files will have to be read from a disk or other storage device. It is, however, still possible to ensure their integrity by the use of integrity information, e.g., checksums for the files, stored on the smartcard (by a system administrator).

In step 78 the BIOS Extension program reads the file integrity information 44 from the EEPROM 40 of the smartcard 22. Then, for each file whose integrity is required, e.g., IO.SYS, etc, the integrity information for that file is validated (step 80). If the OS files are found to be invalid 82 then and error is reported 84 to the user on display 18. If the error is considered to be severe 88 then the boot process terminates 90. (The determination of what constitutes "severe" is made in advance by the system administrator based on the security requirements of the system. In some systems no file changes are allowed, in others some specific files may be modified, but not others.)

If the file integrity information is valid (or the error is not considered severe) then the boot sector that was loaded from the smartcard (in step 76) is executed 86. At this point the boot process will continue as if the boot sector had been loaded from a disk (as in the unsafe system).

In the BITS system, cards are configured and issued by a security officer using the software provided—the current prototype is written in C to improve portability.

Configuration entails the loading onto the smartcard of the boot sector 42 as well as digital signatures for boot files stored on the host 44. At the time of issue, it is necessary to specify the machine or set of machines 46 that the user to whom the card is being issued will be granted access so that a host key may be loaded. File integrity information and portions of the host operating system are also loaded onto the smartcard at this time 44. All data is read protected by the user's authentication (e.g., cannot be read unless the user password is presented correctly), and write protected by the security officer authentication. This arrangement (depicted in Table 2) prevents users from inadvertently or deliberately corrupting critical data on the smartcard.

Smartcards may be issued on a per host, per group, or per site basis depending on the level of security desired. Since the secret shared by the host and card is configurable on the host, it is possible to issue smartcards in a one-to-one, many-to-one, or many-to-many fashion. A one-to-one mapping of users to hosts corresponds to securing a machine for a single user. Analogously, many-to-one allows the sharing of a single machine, and many-to-many allows for the sharing of multiple machines among an explicit set of users. One-to-many is a possible, but usually wasteful, mapping of computer resources.

TABLE 2

| | BITS Smartcard Configuration | |
|---|---|---|
| Step | Action | Implementation |
| 0 | Security officer creates user and security officer accounts on card | Present manufacturer password and load user-specified secret codes for accounts. |
| 1 | Load boot-sector onto card | Create a file readable under the user password and writable under the security officer password and write the |

TABLE 2-continued

BITS Smartcard Configuration

| Step | Action | Implementation |
|---|---|---|
| | | partition boot record. |
| 2 | Compute and load signatures for selected files | For each file compute a hash which is encrypted by the card. This signature together with the file name is stored on the card. |
| 3 | Load host authentication information | Create a file readable under the user password and writable under the security officer password and write a secret to be shared with the host. |

The effectiveness of BITS is limited by the feasibility of storing all boot-relevant information on a smartcard. To the extent this is possible, boot integrity will be maintained. BITS is not a virus checker, however, for those files whose signatures are stored on the smartcard, it is possible to detect the modification of the file on the host system. Thus the user may be notified that an executable is suspect before it is run. In general BITS will provide enhanced computer security by utilizing the secure storage and processing capabilities inherent to the smartcard.

From a security perspective, the less that a user depends upon from a shared environment, the better. Any shared writable executable may potentially contain malicious code. Fortunately, advances in technology are likely to permit the storage of entire operating systems as well as utilities on a smartcard, thus obviating the necessity of sharing executables altogether.

Smartcards themselves may also be made more secure. Currently, authentication to the smartcard is limited to user-supplied passwords. In most systems, three consecutive false presentations results in the smartcard account being disabled. However, if biometric authentication (e.g., fingerprint checks or retinal scans) is incorporated into the card, it will be possible to achieve higher assurance in user authentication.

To date, the size requirements of smartcards have imposed the greatest limitation upon their utility; the current state of the art is a 1.0 micron resolution in the burning of chip masks. However, SGS Thompson and Phillips recently announced the development of 0.7 micron technology as well as plans for a 0.5 micron technology. Regardless of these advances, the chips themselves are still currently limited to a few millimeters on a side due to the brittle nature of the silicon substrate from which they are made. A flexible substrate might allow chips which occupy the entire surface of the smartcard resulting in an exponential gain in computing resources.

A smartcard with this capability would result in a truly portable (wallet-sized) personal computer which could be made widely available at relatively low cost. In this type of computing environment only the bulky human interface need be shared. A computing station might consist of a monitor, a keyboard, a printer, and a smartcard interface. The user could walk up to the computing station, supply the CPU and data storage, and begin work.

The implications of this technology are impressive. The existence of instant PC access for millions regardless of location would greatly enhance the utility of computers. The ability to use the same environment wherever one chooses to work would eliminate time spent customizing and increase productivity. The security provided by smartcards may also result in increased security for sensitive data by decreasing the likelihood of compromise or loss.

Because of the mode in which the invention is used, it might be wrongly compared with a boot from floppy disk. While it is true that inserting a smartcard is similar to inserting a floppy, the interaction during the boot sequence is entirely different. The smartcard-based system incorporates two separate authentications, user to card and card to host, which are entirely absent from the floppy boot. Further, the integrity of the boot information on a floppy is protected only by an easily removed write-protect-tab; while the smartcard requires the authentication of the security officer in order to update boot information. One may also note the ease of carrying a smartcard as compared with a floppy disk.

The invention has been installed and tested on a desktop computer. However, the system is easily generalizable to any computing environment including mainframe, microcomputer, workstation, or laptop. The intelligent token of choice for this embodiment is a smartcard. The reason is that ISO Standard smartcards are expected to be the most ubiquitous and consequently the least expensive form of intelligent token.

Appendix A, incorporated by reference, is a source code listing of the BIOS Extension code loaded onto the memory of the addin board (as described above) written in 8088 Assembly language. This code may be assembled using a Borland Turbo Assembler (TASM TM) and linked using a Borland Turbo Linker (TLINK TM), and run on a AT Bus (ISA compatible) computer running a DOS compatible OS. Appendix A contains material which is subject to copyright protection. The owner has no objection to facsimile reproduction by anyone of the patent document or the patent disclosure, as it appears in the patent and Trademark Office patent file or records, but otherwise reserves all rights whatsoever.

Appendix A

Copyright rights and all other rights reserved.

```
;dosbits.asm      Paul C. Clark
;              BOOT INTEGRITY TOKEN SYSTEM - DOS Version
;                 BIOS Extension for DOS smartcard boot
;                    Version 1
```

```
;       Useful Defines
ACK                 EQU     60h
ETX                 EQU     03h
NAK                 EQU     000E0h
COM1_CTL_REG        EQU     003FCh
COM1_DATA_REG       EQU     003F8h
COM1_STAT_REG       EQU     003FDh
STACKAREA   EQU     06000h
SCRATCHAREA EQU     07000h
PBRAddress  EQU     07C00h
PWDAddress  EQU     0C007h ;-----------------------------------------------------
Cseg            Segment Para Public 'Code'
                Assume CS:Cseg
                Org 03h                         ;Code starts after extension
                                                ;signature and length
                Mov     BX,SP                   ;Save stack
                Mov     CX,SS
                Push    BX
                Push    CX
                Mov     AX,STACKAREA            ;Set up new stack
                Mov     SS,AX
                Mov     SP,0000h
                Mov     AX,SCRATCHAREA          ;Set scratch area
                Mov     ES,AX
                Push    CS                      ;Data seg = Code seg for small model
                Pop     DS
                Sti                             ;Allow breaks
                Cld                             ;Set direction to increment
                Call    Main Pop     CX                      ;Restore original stack
                Pop     BX
                Mov     SS,CX
                Mov     SP,BX Jmp     Int19Hdl                ;Execute the PBR
Abort           Label   Near
                DB      0CBh                    ;Far return opcode
;               Mov     AH,4Ch                  ; Return control to DOS
;               INT     21h ;-----------------------------------------------------
;Identify BIOS extension
;-----------------------------------------------------
                DB      'ROM BIOS Extension for DOS BITS '
                DB      'Version 1 '

;-----------------------------------------------------
```

```
;Main Program
;-----------------------------------------------
Main            Proc    Near Call    InitPort                ;Initialize COM port
                Call    ClrScr                  ;Clear screen
                Call    DrawBox                 ;Draw the frame for dialog
                Mov     DX,071Ah
                Mov     SI,offset STitle        ;Display title
                Call    StrScr
                Mov     DX,081Eh
                Mov     SI,offset SSTitle       ;Display subtitle
                Call    StrScr
                Mov     DX,0A1Dh
                Mov     SI,offset InsrtCrd      ;Prompt user for card
                Call    StrScr
                Call    WaitCard                ;Wait until card is inserted
                Call    GetPwd                  ;Get and present password
                Mov     AX,SCRATCHAREA
                Mov     ES,AX
                Call    ReadPbr                 ;Read and install PBR from card Mov     DX,0C1Ah
                Mov     SI,offset Erase         ;Erase load message
                Call    StrScr
                Mov     DX,0C1Ah                ;Notify user of file checking
                Mov     SI,offset FileChk
                Call    StrScr Call    ChkIO                   ;Check IO.SYS integrity
                Call    ChkMSDOS                ;Check MSDOS.SYS integrity
                Call    ChkCMD                  ;Check COMMAND.COM integrity
                Call    ChkCFGSYS               ;Check CONFIG.SYS integrity Mov     DX,0C1Ah
                Mov     SI,offset Erase         ;Erase file check message
                Call    StrScr
                Call    ClrScr Mov     SI,offset PowerOff      ;Remove power from card
                Call    CReaderCom ;PC hangs part way through boot process using this
technique! Needs fix!
```

```
;               Xor     AX,AX               ;Replace INT 19
handler with
;               Mov     DS,AX               ;address of PBR
;               Lea     AX,PBRAddress       ;Jump to where
the PBR is
;               Mov     DS:[0064],AX
;               Push    CS
;               Pop     AX
;               Mov     DS:[0066],AX
;               Int     19

Ret
Main            Endp

;-----------------------------------------------------------
;Interrupt 19 (Warm Boot) Handler
;       - execute PBR loaded from card.
;-----------------------------------------------------------
Int19Hdl        Proc    Far
                Sti
                DB      0EAh,00h,7Ch,00h,00h  ;Far JMP to
0000:7C00
Int19Hdl        EndP ;-----------------------------------------------------------
;Initialize COM1: 9600,N,8,1
;-----------------------------------------------------------
InitPort        Proc    Near
                Push    AX
                Push    DX Mov     AH,00               ;Interrupt 14
service 0
                Mov     AL,11100011b        ;9600 baud, no
parity, 8 bit data
                Mov     DX,0000             ;COM1:
                Int     14h Pop     DX
                Pop     AX
                Ret
InitPort        Endp ;-----------------------------------------------------------
;Wait for card to be inserted
;-----------------------------------------------------------
WaitCard        Proc    Near
                Cli WaitLoop        Label   Near
                Push    DS Mov     SI,offset InitRdr   ;Initizlize
reader
                Call    CReaderCom
                Mov     SI,offset StCrdTp   ;Set card type
                Call    CReaderCom
                Mov     SI,offset InitRdr   ;Reset card
```

```
                Call    CReaderCom
                Mov     SI,offset PowerOn    ;Apply power to card
                Call    CReaderCom
                Mov     SI,0001h
                Mov     BX,SCRATCHAREA
                Mov     DS,BX
                Lodsb
                Cmp     AL,04h               ;If return code is 4 bytes,
                Pop     DS                   ;Card isn't there!
                Jz      WaitLoop             ;Otherwise something is there...

Sti
                Ret
WaitCard        Endp

;-----------------------------------------------------------
;Get password from user and present to card
;-----------------------------------------------------------
GetPwd          Proc    Near
                Push    AX
                Push    CX
                Push    DS
                Push    DI
PwdLoop         Label   Near
                Mov     CX,00h               ;Initialize character count
                Mov     DX,0A1Ah              ;Erase previous message
                Mov     SI,offset Erase
                Call    StrScr
                Mov     DX,0A1Ah
                Mov     SI,offset PwdPrmpt   ;Display password prompt
                Call    StrScr
                Mov     DI,PWDAddress ReadLoop        Label   Near Mov     SI,offset KbdStat    ;Display keyboard status label
                Mov     DX,0101h
                Call    StrScr
                Mov     AH,01h               ;Check keyboard status
                Int     16h                  ;
                Call    DispStat             ;Display Keyboard Status
                Jz      ReadLoop             ;Loop on empty buffer Mov     DX,CX                ;Put the cursor in the right place
```

```
                Add        DX,0A24h
                Call       CurPos

Mov        AH,0h
                Int        16h                ;Read character from keyboard
                Cmp        AL,08h             ;Check for <BACKSPACE>
                Je         EraseChar
                Cmp        AL,0Dh             ;Check for <RETURN>
                Je         SpaceFill
                Cmp        AL,1bh             ;check for <ESC>
                Je         SpaceFill
                Cmp        CX,08h             ;Length cannot exceed eight
                Jge        Beep Stosb                         ;Store as part of presentation str
                Inc        CX                 ;Increment character count
                Mov        AL,'X'
                Call       DisplayChar
                Jmp        ReadLoop EraseChar       Label      Near               ;Process a BACKSPACE
                Cmp        CX,00h             ;Is backspace all there is?
                Je         Beep               ;if no chars to delete goto read loop
                Dec        DI                 ;Remove character before backspace
                Dec        CX                 ;Decrement char count
                Call       DisplayChar
                Mov        AL,' '
                Call       DisplayChar
                Mov        AL,08h
                Call       DisplayChar
                Jmp        ReadLoop
Beep            Label      Near               ;Ring the bell and continue
                Mov        AL,07h
                Call       DisplayChar
                Jmp        ReadLoop SpaceFill       Label      Near               ;User has pressed RETURN or ESC
                Mov        AL,' '             ;Pad out pwd with spaces
padloop         label      near
                Cmp        CX,08h
                Jge        Presentpw          ;After space padding, send pw
                Stosb
                Inc        CX
                Jmp        padloop
```

```
Presentpw    Label    Near
;Jmp CodeOK
             Mov      AX,0C000h          ;Fill-in rest of
present code cmd
             Mov      DI,AX
             Mov      AL,0Eh
             Stosb
             Mov      AX,000Dh
             Stosw
             Mov      AX,0020h
             Stosw
             Mov      AX,0804h
             StoSw Mov      SI,0C000h          ;Present the code to
the reader
             Mov      AX,SCRATCHAREA
             Mov      DS,AX
             Call     CReaderCom Mov      SI,0003            ;Look at the card
response string
             Lodsb
             Cmp      AL,90h             ;90h = code ok
             Je       CodeOK
             Lodsb
             Cmp      AL,40h             ;9840h = card locked
(!)
             Je       CardLock
             Mov      DX,0C1Ah
             Mov      SI,offset BadPass
             Call     StrScr
             Jmp      PwdLoop            ;Give it another try CardLock     Label    Near               ;Card is locked...
             Mov      DX,0A1Ah
             Mov      SI,offset Erase
             Call     StrScr
             Mov      DX,0C1Ah
             Mov      SI,offset Erase
             Call     StrScr
             Mov      DX,0B20h
             Mov      SI,offset CdLck    ;Inform user
             Call     StrScr
             Mov      DX,0C1Ah
             Mov      SI,offset CdLck2
             Call     StrScr
             Mov      SI,offset PowerOff
             Call     CReaderCom
LockLoop     Label    Near
             Jmp      LockLoop           ;Hang in infinite loop CodeOK       Label    Near               ;Presentation was OK...

Mov      DX,0C1Ah
             Mov      SI,offset Erase
```

```
            Call    StrScr
            Mov     DX,0C1Ah
            Mov     SI,offset Corrct    ;Inform user
            Call    StrScr Pop     DI
            Pop     DS
            Pop     CX                  ;Cleanup and return
            Pop     AX
            Ret
GetPwd      Endp ;-----------------------------------------------
;Load partition boot record from card
;-----------------------------------------------
ReadPBR     Proc    Near
            Push    DS
            Mov     SI,offset SelPbrFl  ;Select the PBR
file
            Call    CReaderCom Mov     AX,0C000h           ;Form command at
7000:C000
            Mov     DI,AX
            Mov     AX,0DB06h           ;Store command
bytes
            Stosw
            Mov     AX,0B200h
            Stosw
            Xor     AX,AX
            Stosw
            Mov     AL,34h
            Stosb Xor     DX,DX               ;Init no. bytes
read
            Mov     BH,01h
RFLoop      Label   Near
            Mov     AX,0C004h
            Mov     DI,AX
            Mov     AX,DX
            Mov     CL,04h
            Div     CL
            Stosb
            Cmp     BH,0Ah
            Jne     SendRdCmd
            Inc     DI
            Mov     AL,2Ch
            Stosb
SendRdCmd   Label   Near
            Mov     SI,0C000h
            Mov     AX,SCRATCHAREA
            Mov     DS,AX
            Call    CReaderCom
            Push    ES
```

```
                Xor     AX,AX
                Mov     ES,AX           ;Destination
segment 0000
                Mov     SI,0003         ;Skip header
bytes
                Mov     AX,PBRAddress
                Add     AX,DX
                Mov     DI,AX
                Add     DX,0034h
                Mov     CX,001Ah
                Cmp     BH,0Ah
                Jne     DoCopy
                Mov     CX,0016h
DoCopy          Label   Near
                Repz
                Movsw                   ;Copy word at a
time
                Pop     ES
                Inc     BH
                Cmp     BH,0Bh
                Jne     RFLoop Pop     DS
                Ret
ReadPBR         Endp ;------------------------------------------------------
;Check integrity of IO.SYS
;------------------------------------------------------
ChkIO           Proc    Near Mov     DX,0C2Ah        ;Display filename
                Call    CurPos
                Mov     SI,offset File1
                Call    StrScr
                Push    BX
                Mov     BX,0004h        ;Simple delay for
simulation
                Call    Delay
                Pop     BX
                Ret
ChkIO           Endp ;------------------------------------------------------
;Check integrity of MSDOS.SYS
;------------------------------------------------------
ChkMSDOS        Proc    Near Mov     DX,0C2Ah        ;Erase previous
filename
                Mov     SI,offset SErase
                Call    StrScr
                Mov     DX,0C2Ah        ;Display filename
                Mov     SI,offset File2
                Call    StrScr
                Push    BX
```

```
                Mov     BX,0004h              ;Simple delay for
simulation
                Call    Delay
                Pop     BX Ret
ChkMSDOS        Endp ;------------------------------------------------
;Check integrity of COMMAND.COM
;------------------------------------------------
ChkCMD          Proc    Near Mov     DX,0C2Ah              ;Erase previous
filename
                Mov     SI,offset SErase
                Call    StrScr
                Mov     DX,0C2Ah              ;Display filename
                Mov     SI,offset File3
                Call    StrScr
                Push    BX
                Mov     BX,0004h              ;Simple delay for
simulation
                Call    Delay
                Pop     BX Ret
ChkCMD          Endp ;------------------------------------------------
;Check integrity of CONFIG.SYS
;------------------------------------------------
ChkCFGSYS       Proc    Near Mov     DX,0C2Ah              ;Erase previous
filename
                Mov     SI,offset SErase
                Call    StrScr
                Mov     DX,0C2Ah              ;Display filename
                Mov     SI,offset File4
                Call    StrScr
                Push    BX
                Mov     BX,0004h              ;Simple delay for
simulation
                Call    Delay
                Pop     BX
                Ret
ChkCFGSYS       Endp ;------------------------------------------------
;Busy wait:
;       - duration passed in BX
;------------------------------------------------
Delay   Proc Near
        Push BX
        Push CX
```

```
DLoop0   Label       Near
         Mov   CX,0000
DLoop1   Label       Near
         Inc   CX
         Cmp   CX,0FFFFh
         Jne   DLoop1
         Dec   BX
         Jnz   DLoop0
         Pop   CX
         Pop   BX
         Ret
Delay    Endp ;------------------------------------------------
;Transmit byte to COM1:
;        - byte passed on stack
;------------------------------------------------
SendByte    Proc    Near
            Push    BP
            Mov     BP,SP
            Push    AX
            Push    DX Mov     DX,0000
SendDly     Label   Near              ;Delay to prevent overrun
            Inc     DX
            Cmp     DX,00FFh
            Jnz     SendDly Mov     DX,COM1_CTL_REG   ;Indicate send
            Mov     AL,0Bh
            Out     DX,AL Mov     DX,COM1_DATA_REG  ;Output byte to port
            Mov     AL,byte ptr [BP+4]
            Out     DX,AL Pop     DX
            Pop     AX
            Pop     BP
            Ret
SendByte    Endp ;------------------------------------------------
;Transmit ASCII representation of byte to COM1:
;        - byte passed on stack
;------------------------------------------------
ASendByte   Proc    Near
            Push    BP
            Mov     BP,SP
            Push    AX
            Push    DX
            Push    CX
```

```
            Mov     AL,byte ptr [BP+4]    ;Get byte
            Mov     AH,00
            Mov     CL,04h
            Shr     AX,CL                 ;Arith shift right
            Cmp     AX,0Ah                ;Result > 10 (A..F) ?
            Jge     HAlpha                ;Yes, calc ASCII for
letter
            Add     AL,30h                ;No, calc ASCII for
number
            Jmp     HSend
HAlpha      Label   Near
            Add     AL,37h                ;Calc ASCII for
letter
Hsend       Label   Near
            Push    AX
            Call    SendByte              ;Send out calculated
byte
            Add     SP,02h Mov     AL,byte ptr [BP+4]
            And     AX,000Fh              ;Mask out high nibble
            Cmp     AX,0Ah                ;Result > 10 (A..F) ?
            Jge     LAlpha                ;Yes, calc ASCII for
letter
            Add     AL,30h                ;No, calc ASCII for
number
            Jmp     LSend
LAlpha      Label   Near
            Add     AL,37h                ;Calc ASCII for
letter
Lsend       Label   Near
            Push    AX
            Call    SendByte              ;Send out calculated
byte
            Add     SP,02h Pop     CX
            Pop     DX
            Pop     AX
            Pop     BP
            Ret
ASendByte   Endp ;-------------------------------------------------
;Get byte from COM1:
;       -byte returned in AL
;-------------------------------------------------
RcvByte     Proc    Near
            Push    DX Mov     DX,COM1_STAT_REG      ;Wait for receive ready
GetByte     Label   Near
            In      AL,DX
            And     AL,01h
            Jz      GetByte
```

```
                Mov     DX,COM1_DATA_REG    ;Get byte
                In      AL,DX Pop     DX
                Ret
RcvByte         Endp ;------------------------------------------------
;Get byte from COM1: converting from ASCII representation to byte
;           -byte returned in AL
;           -ETX returns 01 in AH, 00 otherwise
;------------------------------------------------
ARcvByte        Proc    Near
                Push    BX
                Push    CX Call    RcvByte             ;Get a byte from port
                Cmp     AL,ETX              ;Is it ETX?
                Je      RcvEtx Cmp     AL,41h              ;Not ETX, convert to high nibble
                Jge     HNumCvt
                Sub     AL,30h
                Jmp     RcvLow
HNumCvt         Label   Near
                Sub     AL,37h RcvLow          Label   Near
                Mov     BL,AL               ;Store high nibble in BL
                Call    RcvByte             ;Get another byte from port
                Cmp     AL,41h              ;Convert to low nibble
                Jge     LNumCvt
                Sub     AL,30h
                Jmp     Combine
LNumCvt         Label   Near
                Sub     AL,37h Combine         Label   Near
                Mov     CL,04
                Shl     BL,CL
                Or      AL,BL               ;Combine h/l nibbles into byte
                Mov     AH,00
                Jmp     RcvDone RcvEtx          Label   Near
                Mov     AH,01               ;ETX, set AH = 1

RcvDone         Label   Near
                Pop     CX
                Pop     BX
                Ret
ARcvByte        Endp
```

```
;----------------------------------------------------
;Send NAK to reader/writer (request retransmission)
;----------------------------------------------------
SendNAK     Proc    Near
            Push    AX Mov     AL,NAK              ;Transmit NAK
            Push    AX
            Call    ASendByte
            Add     SP,02h Mov     AL,00               ;Command length is 0
            Push    AX
            Call    ASendByte
            Add     SP,02h Mov     AL,NAK              ;CRC is just NAK byte
            Push    AX
            Call    ASendByte
            Add     SP,02h Mov     AX,ETX              ;Transmit ETX
            Push    AX
            Call    SendByte
            Add     SP,02h Pop     AX
            Ret
SendNAK     Endp ;----------------------------------------------------
;Send command to reader/writer
;       -check response for NAK and retransmit if necessary
;       -pointer to string passed in DS:SI
;----------------------------------------------------
CReaderCom  Proc    Near
            Push    AX
            Push    BX
            Push    CX
            Push    DX CommandLoop Label   Near
            Push    DS
            Push    SI
            Call    ReaderCom           ;Send reader/writer command
            Call    CGetResp            ;Get reader/writer response
            Push    ES
            Pop     DS
            Mov     SI,0000
            Lodsb                       ;Look at first byte of response
            Cmp     AL,NAK              ;NAK? message not received properly
            Jne     RecvOK              ;Not NAK, message
``` recieved OK
```
                Pop     SI
                Pop     DS
                Jmp     CommandLoop             ;Try again RecvOK          Label   Near
                Pop     SI
                Pop     DS
                Pop     DX
                Pop     CX
                Pop     BX
                Pop     AX
                Ret
CReaderCom      Endp
```

;----------------------------------------------------
;Send command to reader/writer
;        -pointer to string passed in DS:SI
;----------------------------------------------------
```
ReaderCom       Proc    Near
                Mov     AL,ACK                  ;Transmit ACK
                Mov     BL,AL                   ;Store for CRC
                Push    AX
                Call    ASendByte
                Add     SP,02h Lodsb                           ;Load command length
                Xor     BL,AL                   ;Compute CRC
                Push    AX
                Call    AsendByte               ;Transmit command
length
                Add     SP,02h Mov     CL,AL                   ;Loop on command length
                Mov     DL,00
ComLoop         Label   Near
                Lodsb                           ;Get next command byte Xor     BL,AL                   ;Compute CRC
                Push    AX
                Call    ASendByte               ;Transmit command byte
                Add     SP,02h
                Inc     DL
                Cmp     DL,CL
                Jnz     ComLoop Push    BX                      ;Transmit computed CRC
                Call    ASendByte
                Add     SP,02h Mov     AL,ETX                  ;Transmit ETX
                Push    AX
                Call    SendByte
                Add     SP,02h Ret
ReaderCom       Endp
```

```
;------------------------------------------------
;Get response from reader/writer
;         - checks response CRC and requests retransmission
;if necessary
;------------------------------------------------
CGetResp    Proc    Near RespLoop    Label   Near
            Mov     DI,0000             ;Initialize destination ptr
            Call    GetResp             ;Get the response string
            Cmp     AL,00
            Jz      RespDone            ;No error, we're finished
            Call    SendNAK             ;Error in response, request retrans
            Jmp     RespLoop RespDone    Label   Near
            Ret
CGetResp    Endp ;------------------------------------------------
;Get a response string from reader/writer
;         -response string stored starting at ES:DI
;------------------------------------------------
GetResp     Proc    Near CharLoop    Label   Near
            Mov     BL,00               ;Initialize for CRC
            Call    ARcvByte            ;Recieve byte
            Stosb
            Xor     BL,AL               ;Calculate CRC
            Cmp     AH,01               ;Repeat until ETX
            Jnz     CharLoop Xor     BL,ETX              ;Remove ETX from CRC
            Dec     DI                  ;Get CRC from response
            Dec     DI
            Lodsb
            Xor     BL,AL               ;Remove CRC from CRC Cmp     AL,BL               ;Compare with calculated CRC
            Jz      RespOK
            Mov     AL,01               ;Return AL=01 if error
            Ret RespOK      Label   Near
            Mov     AL,00               ;Return AL=00 if no error
            Ret
GetResp     Endp

;------------------------------------------------
```

;Display Contents of AX Register
;------------------------------------------------------------
DispStat        Proc    Near
                Push    CX              ;Save registers
                Push    BX
                Mov     CX,0004h        ;Shift by one nibble
                Mov     BX,AX           ;Save AX in BX Mov     AL,AH
                Shr     AL,CL
                Call    DispNibble Mov     AX,BX           ;Reset AX
                Mov     AL,AH
                Call    DispNibble Mov     AX,BX           ;Reset AX
                Shr     AL,CL
                Call    DispNibble Mov     AX,BX           ;Reset AX
                Call    DispNibble Mov     AX,BX           ;Reset AX
                Pop     BX
                Pop     CX
                Ret
DispStat        Endp ;------------------------------------------------------------
;Display character and advance cursor
;       -character to be displayed is passed in AL
;------------------------------------------------------------
DisplayChar     Proc    Near
                Push    AX              ;Save contents of AX
                Push    BX              ;Save contents of BX
                Push    CX              ;Save character count
                Mov     AH,0eh          ;Display X's this should go away)
                Mov     BH,00h          ;Select video page 0
                Mov     CX,01
                Int     10h             ;Echo character
                Pop     CX              ;Restore CX to character count
                Pop     BX              ;Restore BX
                Pop     AX              ;Restore AX
                Ret
DisplayChar     Endp ;------------------------------------------------------------
;Display nibble - character to be displayed is
;       passed in the lower nibble of AL
;------------------------------------------------------------
DispNibble      Proc    Near
                Push    AX              ;Save contents of AX
                And     AL,0Fh          ;Mask AL

```
                Cmp     AL,0Ah
                Jge     letter          ;Display A-F not digit
                Add     AL,'0'
                Call    DisplayChar
                Pop     AX              ;Restore AX
                Ret
letter          Label   Near
                Sub     AL,0Ah
                Add     AL,'A'
                Call    DisplayChar
                Pop     AX              ;Restore AX
                Ret
DispNibble      Endp ;----------------------------------------------
;Send string to screen
;       -pointer to string passed in DS:SI
;       -location on screen passed in DX (row,col)
;----------------------------------------------
StrScr          Proc    Near
                Push    AX
                Push    BX
                Push    CX Mov     AH,09           ;Interrupt 10 service 9
                Mov     BH,00           ;Video page 0
                Lodsb
                Mov     BL,AL           ;Load attribute byte
                Mov     CX,0001         ;Only display one of each char
ScrLoop         Label   Near
                Call    CurPos          ;Move cursor
                Lodsb
                Or      AL,AL           ;Our end of string byte?
                Jz      ScrDone         ;If so, we're done...
                Int     10h             ;Otherwise display character
                Inc     DX              ;Increment cursor position
                Jmp     ScrLoop         ;Repeat with next character
ScrDone         Label   Near Pop     CX
                Pop     BX
                Pop     AX
                Ret
StrScr          Endp ;----------------------------------------------
;Draw box frame for dialog
;----------------------------------------------
```

```
DrawBox   Proc    Near
          Mov     DX,0517h
          Call    CurPos
          Mov     AH,09           ;Service 9
          Mov     BH,00           ;Primary video page
          Mov     BL,07           ;Character attribute Mov     CX,0001         ;Display only one
          Mov     AL,0C9h         ;Upper left corner
          Int     10h Mov     DX,0518h        ;Top bar
          Call    CurPos
          Mov     AL,0CDh
          Mov     CX,001Fh
          Int     10h Mov     DX,0537h        ;Upper right corner
          Call    CurPos
          Mov     AL,0BBh
          Mov     CX,0001
          Int     10h Mov     DX,0E17h        ;Lower left corner
          Call    CurPos
          Mov     AL,0C8h
          Int     10h Mov     DX,0E18h        ;Bottom bar
          Call    CurPos
          Mov     AL,0CDh
          Mov     CX,001Fh
          Int     10h Mov     DX,0E37h        ;Lower right corner
          Call    CurPos
          Mov     AL,0BCh
          Mov     CX,0001
          Int     10h Mov     DX,0617h        ;Left side
          Mov     AL,0BAh
LSide     Label   Near
          Call    CurPos
          Int     10h
          Add     DX,0100h
          Cmp     DX,0E17h
          Jne     LSide Mov     DX,0637h        ;Right side
RSide     Label   Near
          Call    CurPos
          Int     10h
          Add     DX,0100h
          Cmp     DX,0E37h
          Jne     RSide
```

```
                Ret
DrawBox         Endp

;------------------------------------------------------------
;Clear screen
;------------------------------------------------------------
ClrScr          Proc    Near
                Push    AX
                Push    BX
                Push    CX
                Push    DX Mov     DX,0000h            ;Home cursor
                Call    CurPos Mov     AH,09h              ;Fill screen with spaces
                Mov     CX,0800h
                Mov     AL,020h
                Mov     BH,00h
                Mov     BL,07h
                Int     10h Mov     DX,0000             ;Home cursor yet again
                Call    CurPos Pop     DX
                Pop     CX
                Pop     BX
                Pop     AX
                Ret
ClrScr          Endp ;------------------------------------------------------------
;Set cursor position
;       -cursor row passed in DH
;       -cursor column passed in DL
;------------------------------------------------------------
CurPos          Proc    Near
                Push    AX
                Push    BX
                Mov     AH,02               ;Interrupt 10 service 2
                Mov     BH,00               ;Video page 0
                Int     10h Pop     BX
                Pop     AX
                Ret
CurPos          Endp ;------------------------------------------------------------
;Data area
;       - Console messages
;       - ISO command strings
;------------------------------------------------------------
;.Data
```

```
;Console messages

STitle      DB      0Ah                                     ;Char attribute (clr)
            DB      'Boot Integrity Token System'           ;String
            DB      00h                                     ;End of string marker
SSTitle     DB      0Ah
            DB      'DOS-BITS Version 1'
            DB      00h
InsrtCrd    DB      07h
            DB      'Please insert card...'
            DB      00h
SErase      DB      07h
            DB      '                     '
            DB      00h
Erase       DB      07h
            DB      '                                    '
            DB      00h
PwdPrmpt    DB      07h
            DB      'Password: '
            DB      00h
BadPass     DB      07h
            DB      'Incorrect. Please try again.'
            DB      00h
Corrct      DB      07h
            DB      'Loading operating system...'
            DB      00h
CdLck       DB      0Fh
            DB      'Card is locked!'
            DB      00h
CdLck2      DB      0Fh
            DB      'Please see Security Manager.'
            DB      00h
KbdStat     DB      07h
            DB      'Keyboard Status: '
            DB      00h
FileChk     DB      07h
            DB      'Checking files: '
            DB      00h
File1       DB      07h
            DB      'IO.SYS'
            DB      00h
File2       DB      07h
            DB      'MSDOS.SYS'
            DB      00h
File3       DB      07h
            DB      'COMMAND.COM'
            DB      00h
File4       DB      07h
            DB      'CONFIG.SYS'
            DB      00h
BadFile     DB      07h
            DB      'Missing or corrupted system file!'
            DB      00h
```

```
OKFile          DB      07h
                DB      'Files OK.  Booting...'
                DB      00h ;Shared secret (card/PC) data SharSec         DB      00h ;Reader and card command strings InitRdr         DB      04h,03h,0Fh,0D0h,0Ah
StCrdTp         DB      03h,02h,02h,00h
RstCard         DB      04h,03h,0Fh,0D0h,0Ah
PowerOn         DB      04h,6Eh,01h,00h,00h
PowerOff        DB      01h,4Dh
SelPbrFl        DB      06h,0DBh,00h,0A2h,02h,7Eh,08h ;Operating system filenames SysFile1        DB      'IO      SYS'
SysFile2        DB      'MSDOS   SYS'
SysFile3        DB      'COMMAND COM'

;End, data area

Cseg            Ends

END

APPL0210.DCO
```

What is claimed is:

1. A method for reducing the possibility of corruption of critical information required in the operation of a computer comprising:
    storing the critical information in a device,
    communicating authorization information between the device and the computer, and
    in the course of booting the computer, executing modified boot code that causes the device, in response to the authorization information, to allow the computer access to the critical information stored in the device.

2. The method of claim 1 wherein the steps of communicating authorization information and enabling the computer to read comprise
    a user entering a password, and
    the device verifying the password.

3. The method of claim 1 wherein the authorization information comprises biometric information about a user.

4. The method of claim 1 further comprising
    storing a password in the device,
    in the device, comparing the stored password with an externally supplied password, and
    basing a determination of whether to enable the computer to read the stored critical information on the results of the step of comparing the passwords.

5. The method of claim 1 wherein the device comprises a microprocessor and a memory.

6. The method of claim 5 wherein the device comprises a pocket-sized card containing the microprocessor and the memory.

7. The method of claim 1 wherein said critical information comprises boot-sector information used in starting the computer.

8. The method of claim 1 wherein said critical information comprises executable code.

9. The method of claim 1 wherein said critical information comprises system data or user data.

10. The method of claim 1 further comprising
    the computer booting itself from the critical information read from the device.

11. The method of claim 1 further comprising storing the modified boot code in the form of a BIOS extension.

12. The method of claim 1 wherein the steps of communicating authorization information and enabling the computer to read, comprise
    the device passing to the computer, secret information shared with the computer, and
    the computer validating the shared secret information passed from the device.

13. The method of claim 12 wherein the shared secret information comprises a host access code.

14. The method of claim 1 wherein the authorization information comprises file signatures for executable code.

15. The method of claim 1 wherein the authorization information comprises a user's cryptographic key.

16. The method of claim 1 wherein the stored critical information includes file integrity information.

17. A method of booting a computer, comprising storing, in a device which is separate from the computer, boot information, user authorization information, and device authorization information in the form of a secret shared with the computer, providing a communication link between the device and the computer, receiving possibly valid authorization information from a user, in the device, checking the possibly valid authorization information against the stored user authorization information to determine validity, if the password is determined to be valid, passing the boot information and the shared secret information from the device to the computer, in the computer, checking the validity of the shared secret information, and in the course of booting the computer, executing modified boot code that causes, if the shared secret information is valid, the boot information to be used in booting the computer.

* * * * *